Patented July 11, 1933

1,917,598

UNITED STATES PATENT OFFICE

AUGUST JOHN PACINI, OF CHICAGO, ILLINOIS

CASCARA SAGRADA

No Drawing.   Application filed February 15, 1932.   Serial No. 593,204.

This invention relates to a new and useful process for making bitterless cascara sagrada extracts and to the product produced thereby.

The medicinal value of cascara sagrada extract is old and well known and such extract has been produced and used for a number of years. It is also known that the extracts of cascara sagrada in their natural untreated form, possess ingredients which are extremely bitter to the taste and which, if not removed, or chemically altered, render the extract so unpalatable as to seriously reduce their use as a medicinal remedy.

Accordingly, in the production of these extracts it has become a common practice to process them for the production of a bitterless extract which is now widely accepted and used as a medicinal remedy.

Methods heretofore known and used for rendering the extracts bitterless involve the use of alkalis such as for instance, lime and magnesia and a maceration treatment requiring a treatment period of from three to four days. This process is satisfactory in its results, but due to the fact that it consumes such a long period of time and is correspondingly expensive, the present invention, which requires only three or four hours, has been developed as an improvement and advance in the art.

It is an object of this invention to provide a process for making bitterless cascara sagrada extract which consumes only a small fraction of the time heretofore required for rendering the extract bitterless.

It is a further object to provide a process which utilizes an aldehyde such as formalin, as a substance for rendering the extract bitterless as distinguished from the use of alkalis such as lime and magnesia.

It is a further object to provide a process which is not only quicker but less expensive and more practical from the commercial standpoint and yet is productive of a final product which is bitterless and of high quality.

These and other objects not specifically enumerated will be readily appreciated by those skilled in the art as the following description proceeds.

The present invention is based upon the discovery that if cascara sagrada is previously macerated in water to which an aldehyde has been or is added, that the aldehyde in some manner eliminates the bitter taste of the cascara. For this use, ordinary commercial formaldehyde or formalin may be used in quantity hereinafter set forth and the mixture boiled until the volume has been reduced to about one half. It is found that the formaldehyde combines with the bitter principles and greatly diminishes or entirely eliminates the bitterness.

Part of the formalin is lost by vaporization during boiling and if desired, all of the formalin may be so eliminated by boiling sufficiently to insure the complete vaporization of all unused formalin in which case additional steps for the elimination of the excess formalin may be eliminated.

Accordingly, it is to be understood that the present invention is to be construed of sufficient scope to include the use of an aldehyde as herein pointed out with the elimination of the excess aldehyde by any method whatsoever, such as by careful boiling or any other suitable method. However, in practice, it is preferred to avoid the careful boiling operation by the addition of ammonia which acts to completely convert the residual formalin into water-soluble harmless hexamethylenamine according to the following well known reaction:

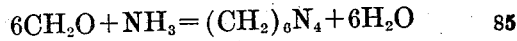

$$6CH_2O + NH_3 = (CH_2)_6N_4 + 6H_2O$$

By way of example, one preferred method of practicing the invention will now be given but it is to be understood that the invention is not to be limited thereby as the scope of the invention will be set forth in the appended claims.

One practical method of practicing this invention is as follows:

To 25 parts by weight of cascara sagrada which may conveniently be in coarsely powdered form, add 400 parts by weight of water and from one to three or more parts by weight of formalin. Usually one part by weight of forty per cent formalin is sufficient. Boil until the volume is reduced to one half. Add as many parts by weight of strong ammonia water as there were added parts of formalin, and continue to boil until the last trace of free ammonia has disappeared. The solution may now be filtered, centrifugalized or clarified by any usual mechanical means, following which it may be boiled to whatever desired concentration is required.

As above pointed out, the addition of the ammonia does not contribute to the removal of any bitterness in this process, as it is merely added for the purpose of neutralizing any residual trace of unused formalin which may remain.

It is not essential to this process that formalin be the aldehyde selected and accordingly the process should not be so limited. Other aldehydes are found to be effective but formaldehyde is preferred because of its cheapness, ready availability and general convenience.

Furthermore, the present invention should not be limited to the exact manner of extraction herein above outlined as the same is not essential to good results. Many and devious modifications according to pharmaceutical experience, will readily suggest themselves to the manufacturing chemist. For example; instead of the above outlined steps, the powdered bark may be moistened with water and formalin; the prolonged boiling may be replaced by maceration for one or more days; filtration may be replaced by percolation and similar substitutions in the procedure may be made, such as would obviously suggest themselves to anyone of pharmaceutical training.

The essential aspect of this invention resides in the use of an aldehyde and accordingly the invention should not be limited to details of procedure by which the product is treated with the aldehyde for rendering it bitterless.

I claim:

1. The process of producing bitterless cascara sagrada extract which consists in subjecting cascara sagrada to the action of an aldehyde until the bitter constituents are substantially bitterless and subsequently eliminating all uncombined aldehyde.

2. The process of producing bitterless cascara sagrada extract which consists in subjecting cascara sagrada to the action of formalin until the bitter constituents are substantially bitterless and subsequently eliminating all uncombined formalin.

3. The process of producing bitterless cascara sagrada extract which consists in subjecting cascara sagrada to the action of an aldehyde until the bitter constituents are substantially bitterless and subsequently eliminating all uncombined aldehyde, by reacting with ammonia.

4. The process of producing bitterless cascara sagrada extract which consists in subjecting cascara sagrada to the action of formalin until the bitter constituents are substantially bitterless and subsequently eliminating all uncombined formalin, by reacting with ammonia.

Signed at Chicago, Illinois, this 9th day of February, 1932.

AUGUST JOHN PACINI.